United States Patent
McCarney

(10) Patent No.: US 7,140,864 B1
(45) Date of Patent: Nov. 28, 2006

(54) TORTILLA FORMING MACHINE

(75) Inventor: Kevin T. McCarney, Burbank, CA (US)

(73) Assignee: Poquito Mas, Inc., North Hollywood, CA (US)

( * ) Notice: Subject to any disclaimer, the term of this patent is extended or adjusted under 35 U.S.C. 154(b) by 375 days.

(21) Appl. No.: 10/818,792

(22) Filed: Apr. 6, 2004

Related U.S. Application Data

(60) Provisional application No. 60/462,492, filed on Apr. 14, 2003.

(51) Int. Cl.
*A21C 11/00* (2006.01)

(52) U.S. Cl. ............... 425/318; 425/408; 425/409; 99/353; 99/432

(58) Field of Classification Search ........... 425/318, 425/408, 409; 99/353, 432, 450.1
See application file for complete search history.

(56) References Cited

U.S. PATENT DOCUMENTS

| | | | |
|---|---|---|---|
| 1,880,858 A | 10/1932 | Davis | |
| 2,975,741 A | 3/1961 | Ruffino | |
| 3,716,319 A | 2/1973 | Norman | |
| 3,814,005 A | 6/1974 | Widdel | |
| 3,949,660 A | 4/1976 | Kuhlman | |
| 4,060,367 A | 11/1977 | Shatila et al. | |
| D255,412 S | 6/1980 | Bereza | |
| 4,303,677 A | 12/1981 | De Acetis | |
| 4,559,002 A | 12/1985 | Atwood | |
| 4,690,043 A | 9/1987 | Pacilio | |
| 4,857,349 A | 8/1989 | Finlay | |
| 4,874,156 A | 10/1989 | Goldzweig | |
| D307,371 S | 4/1990 | D'Orlando | |
| 4,973,240 A | 11/1990 | Reilly | |
| 4,993,932 A | 2/1991 | D'Andrade | |
| 5,074,778 A | 12/1991 | Betts, Jr. et al. | |
| 5,088,912 A * | 2/1992 | Raque et al. | ............... 425/155 |
| 5,149,594 A | 9/1992 | Lewandowski et al. | |
| 5,154,115 A | 10/1992 | Kian | |
| 5,226,352 A | 7/1993 | Savage | |
| D343,627 S * | 1/1994 | Raio | ............... D15/135 |
| 5,417,149 A | 5/1995 | Raio et al. | |
| D369,941 S | 5/1996 | Ramina | |
| D377,138 S | 1/1997 | Angelo | |
| 5,630,358 A * | 5/1997 | Patel | ............... 99/349 |
| 5,800,844 A | 9/1998 | Raio et al. | |
| 5,996,476 A | 12/1999 | Schultz | |
| 6,089,144 A * | 7/2000 | Garber et al. | ............... 99/331 |
| 6,205,914 B1 | 3/2001 | McCarney | |
| 6,244,167 B1 | 6/2001 | Mc Carney | |
| 6,332,768 B1 | 12/2001 | Raio et al. | |
| 6,443,054 B1 | 9/2002 | McCarney | |

FOREIGN PATENT DOCUMENTS

EP 1425970 A1 * 6/2004

* cited by examiner

*Primary Examiner*—Robert B. Davis
(74) *Attorney, Agent, or Firm*—Fay, Sharpe, Fagan, Minnich & McKee, LLP

(57) ABSTRACT

A tortilla-forming machine for molding dough into a tortilla shell. The forming machine having a base with an upwardly facing forming surface and a push plate with a downwardly facing forming surface. The forming machine further including an actuating mechanism with a first member joined to the base and a second member joined to the push plate which moves relative to the base for molding the dough into the tortilla shell. The relative movement including the upper push plate moving relative to the base axially along an actuating axis which is perpendicular to the upwardly facing forming surface and rotating about the actuating axis.

18 Claims, 7 Drawing Sheets

TORTILLA FORMING MACHINE

RELATED APPLICATIONS

The present application claims the benefit of U.S. Provisional Application Ser. No. 60/462,492 entitled "Tortilla Forming Machine" and filed Apr. 14, 2003, which is incorporated by reference herein in its entirety.

The present invention relates to the art of making tortilla shells and, more particularly, to a tortilla-forming machine for making a tortilla shell from a ball of dough.

INCORPORATION BY REFERENCE

The present invention relates to forming a tortilla shell from a ball of dough wherein the forming of the shell is done by a hand-operated machine. Such machines are known in the art and are generally shown in McCarney U.S. Pat. No. 6,205,914, McCarney U.S. Pat. No. 6,244,167 and Schultz U.S. Pat. No. 5,996,476. These patents are incorporated by reference herein and background information illustrating hand-operated tortilla-forming machines which form a ball of dough into a tortilla shell. Raio U.S. Pat. Nos. 5,417,149 and 5,800,844 disclose a device for forming and partially baking a pizza crust from a quantity of pizza dough which is also incorporated herein by reference as background material. Kuhlman U.S. Pat. No. 3,949,660 and Shatila U.S. Pat. No. 4,060,367 are also incorporated by reference as background material showing linear or axial forming machines.

BACKGROUND OF THE INVENTION

It is, of course, well known that a ball of dough can be molded into various shapes and sizes to produce food products. Traditionally, once the desired dough was properly mixed, the dough was rolled to the proper thickness and then cut into the shape needed to produce the food product. However, this method is labor-intensive and costly with respect to retail food products and restaurant services.

Over the years, machines have been utilized to overcome this problem by mechanically forming dough into the desired thickness and shape. In this respect, Schultz discloses a device for pressing and imprinting bread products. The disclosed device utilizes a mold cavity which is permanently attached to the upper support frame of the device, wherein the upper mold portion is pivotal about a horizontal axis relative to the base mold portion for forming the dough thereagainst. The device disclosed in Schultz is utilized for the production of high volumes of dough products in one size. While Schultz discloses a device which provide access to the lower forming plate for loading the dough and unloading the finished shell, the pivotal design lacks any mechanical advantage and also produces uneven forces during dough compression.

Raio U.S. Pat. Nos. 5,417,149 and 5,800,844 disclose dough pressing machines which utilize linear motion between the upper and lower forming surfaces to overcome many of the disadvantages found in the pivotal machines. The quantity of dough can be pressed from a dough ball into a desired thickness by controlling the stroke of the upper forming surface. However, the Raio devices provides minimal access for loading and unloading the dough. Kuhlman U.S. Pat. No. 3,949,660 discloses a dough forming machine that utilizes an actuating cylinder motion to mold a dough ball into a desired thickness. While Kuhlman provides more space between the forming surfaces, access for loading and unloading is still limited.

As will be appreciated from the above, dough forming machines exist in the prior art; however, they are not well adapted for providing both access for loading and unloading and the ability to provide increased mechanical advantage to assist the operator form the shell. Further, many of the prior art machines are designed to be used to produce only one configuration of dough product without major modification.

McCarney U.S. Pat. Nos. 6,244,167 and 6,205,914 overcame many of the problems in the prior art with respect to producing various sizes of shells by utilizing a ring or disk structure which dictates the peripheral configuration and thickness of the resulting tortilla shell. However, the McCarney patents disclose actuating mechanisms that either provide limited mechanical advantage to form the dough products or provide limited access to the forming space which is the space necessary to place the raw dough in position between the forming surfaces and remove the completed shell from the machine.

SUMMARY OF THE INVENTION

In accordance with the present invention, a tortilla forming machine is provided which advantageously allows a dough ball to be easily formed into a tortilla shell without complicated mechanical structures or expensive powered mechanisms. Moreover, the forming machine allows easy access to the forming space of the machine without increasing forming time, the forming stroke or increasing the hand force necessary to form the tortilla shell. In this respect, a tortilla forming machine is provided which includes an upper push plate that moves axially or linearly along a vertical axis toward a base plate and which also rotates about the vertical axis which is perpendicular to the forming surface so that the push plate essentially moves out of the forming space when the machine is in the loading position.

By rotating the push plate out of the forming space about a vertical axis, a linear actuating mechanism can be used which provides the necessary mechanical advantage without requiring significant stroke for adequate access to the forming space. Indeed, by providing rotational movement about a vertical axis for alignment to the base plate and vertical movement along the vertical axis, the upper push plate only needs to move vertically a small distance. In this respect, the axial or vertical motion of the upper push plate provides the forming force for the dough ball while the rotational motion provides access to the forming space.

With respect to the methods used to control the thickness and peripheral shape of the tortilla shell, either one of the upwardly or downwardly facing surfaces can include a cavity corresponding with the configuration and thickness of the tortilla shell and/or utilize sizing rings which are described in McCarney U.S. Pat. Nos. 6,205,914 and 6,244,167.

It is accordingly an object of the present invention to provide an improved tortilla forming machine for molding tortilla shells from a ball of dough.

A further object of the present invention is to provide a tortilla forming machine of the foregoing character which allows a tortilla shell to be quickly formed into a desired thickness and peripheral shape.

Yet another object of the present invention is to provide a tortilla forming machine of the foregoing character which allows the formed tortilla shell to be quickly and easily removed from the forming space.

Yet still another object of the present invention is to provide a tortilla forming machine of the foregoing character which allows full access to the forming space.

Yet a further object of the present invention is to provide a tortilla forming machine of the foregoing character which has an actuating mechanism allowing for easy hand operation without necessitating a significant stroke or blocking the forming space.

Even yet a further object of the present invention is the provision of a tortilla forming machine of the foregoing character which does not need any electrical or other power supply to easily form the tortilla shell.

BRIEF DESCRIPTION OF THE DRAWINGS

The foregoing will in part be obvious and in part be pointed out more fully hereinafter in connection with a written description of a preferred embodiment of the present invention illustrated in the accompanying drawings in which.

DESCRIPTION OF A PREFERRED EMBODIMENT

Figure 1:
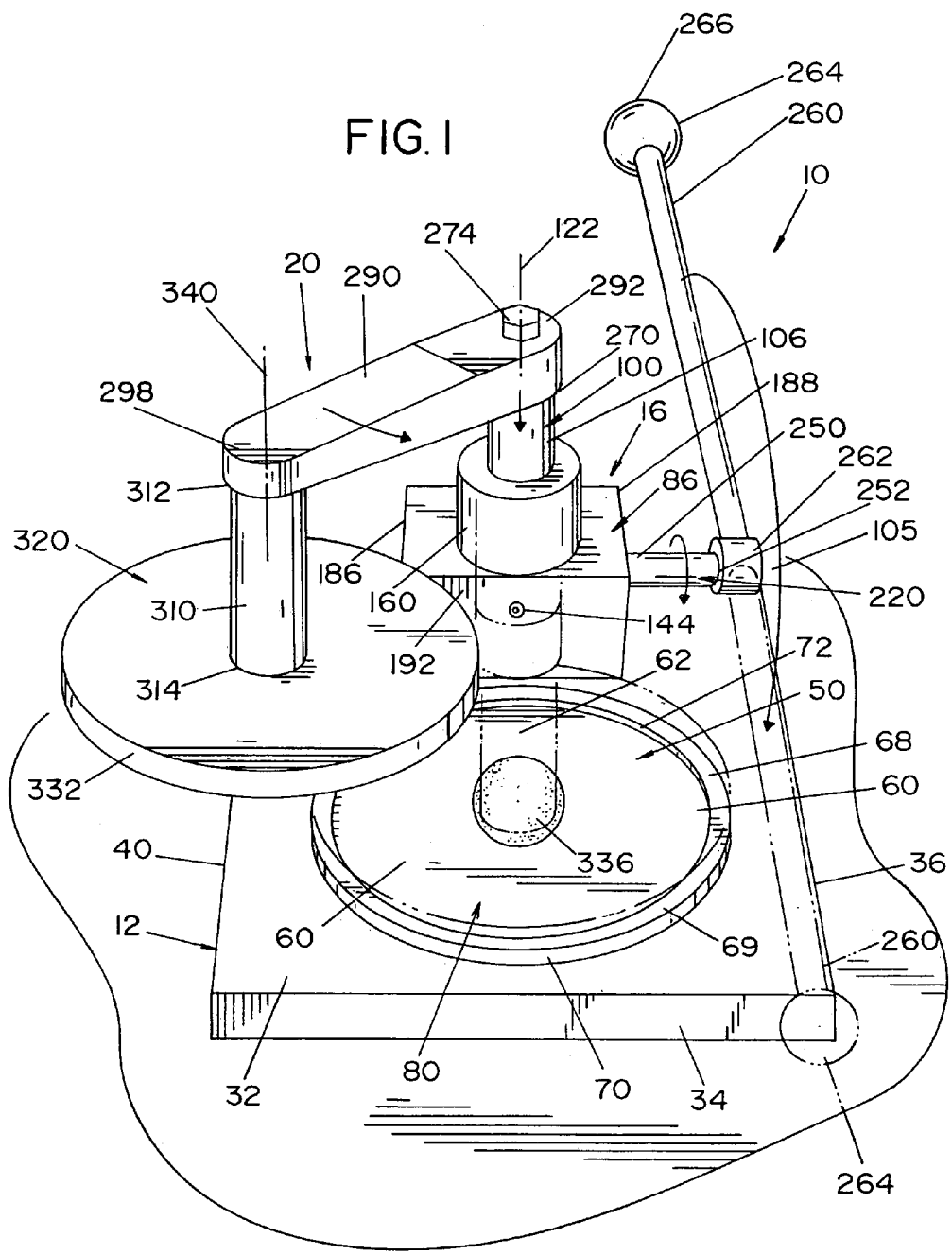
FIG. 1 is a front perspective view of a tortilla forming machine according to the present invention.
Figure 2:
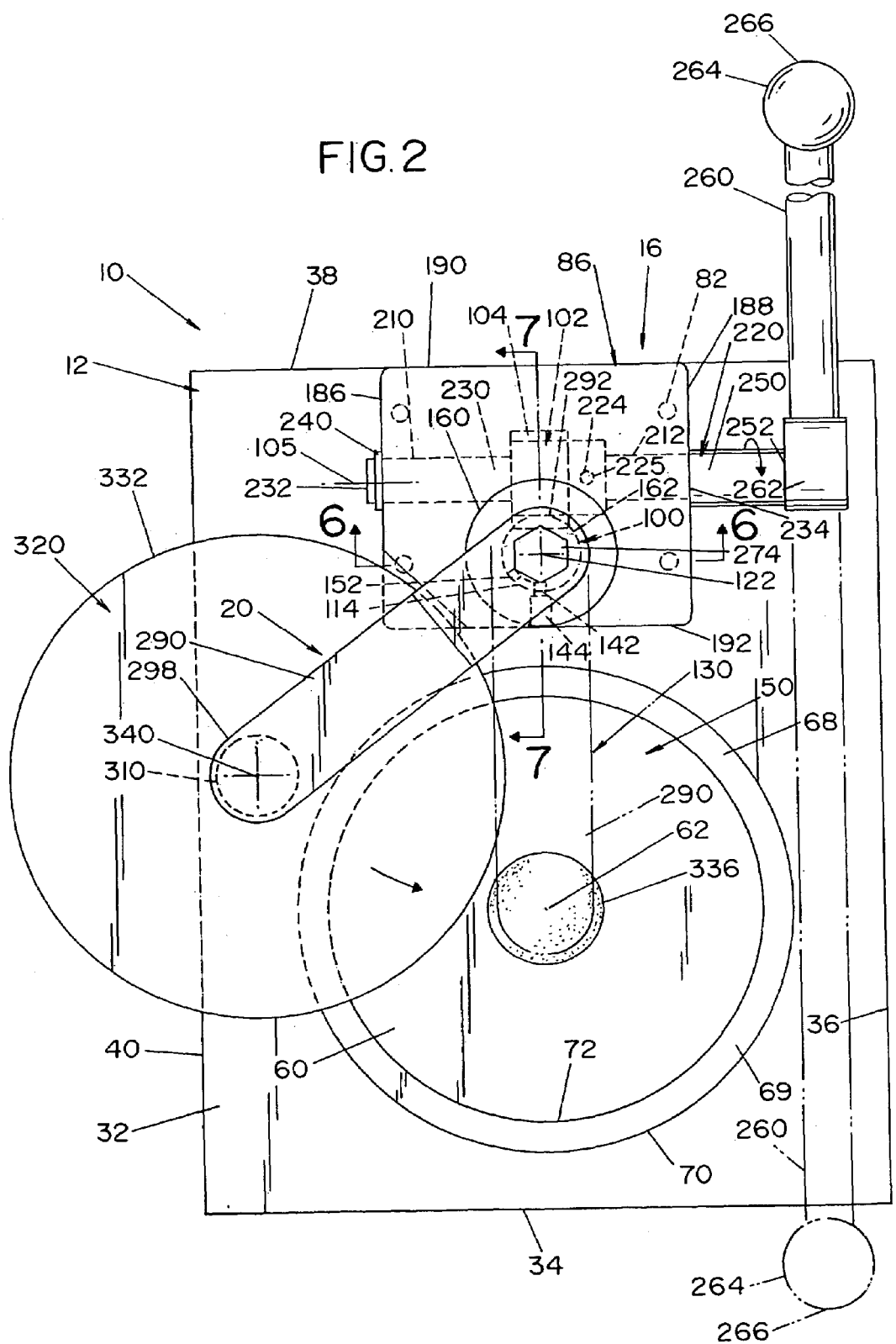
FIG. 2 is a top plan view of the tortilla forming machine shown in FIG. 1.
Figure 3:
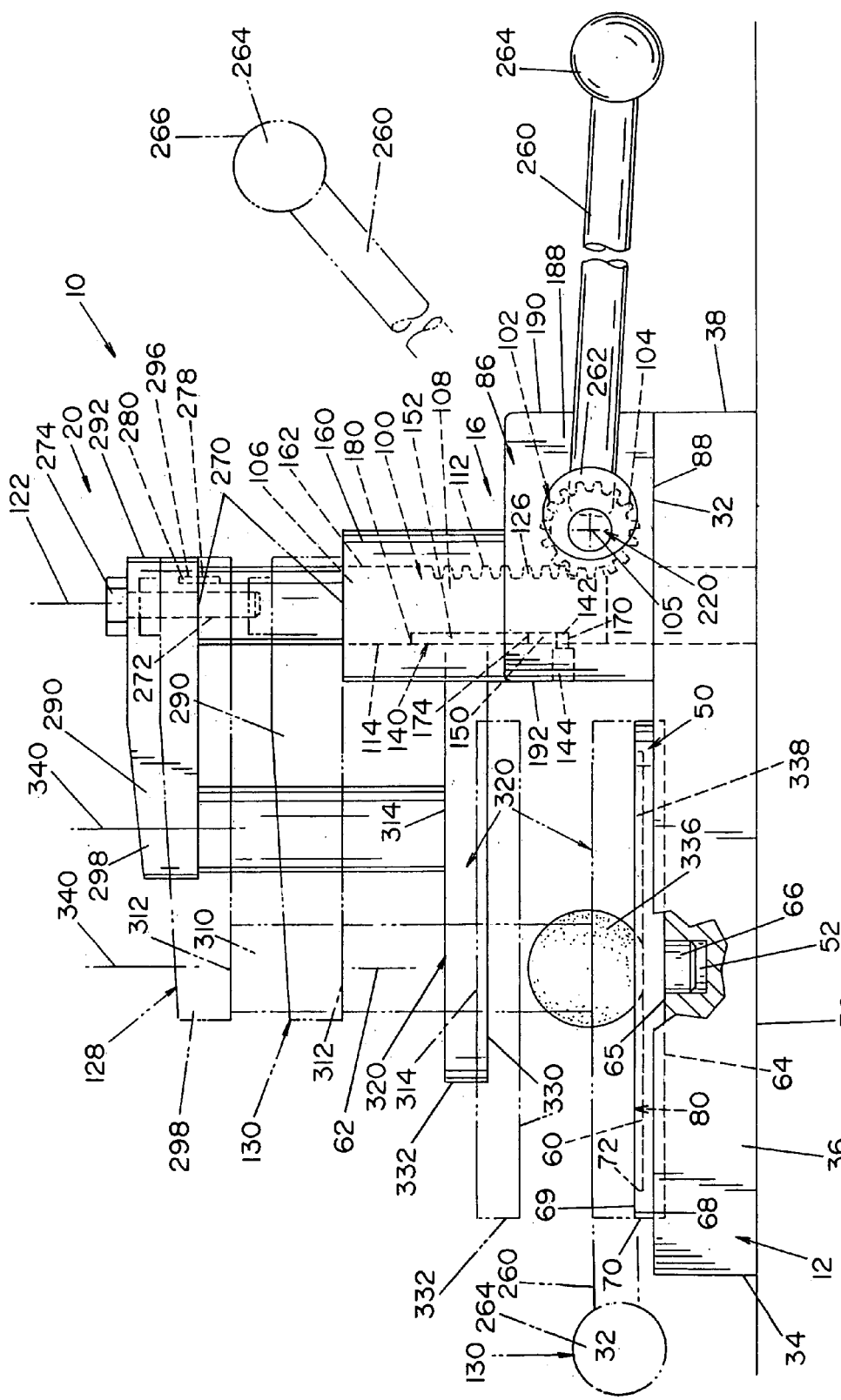
FIG. 3 is a side elevational view of the tortilla forming machine shown in FIG. 1.
Figure 4:
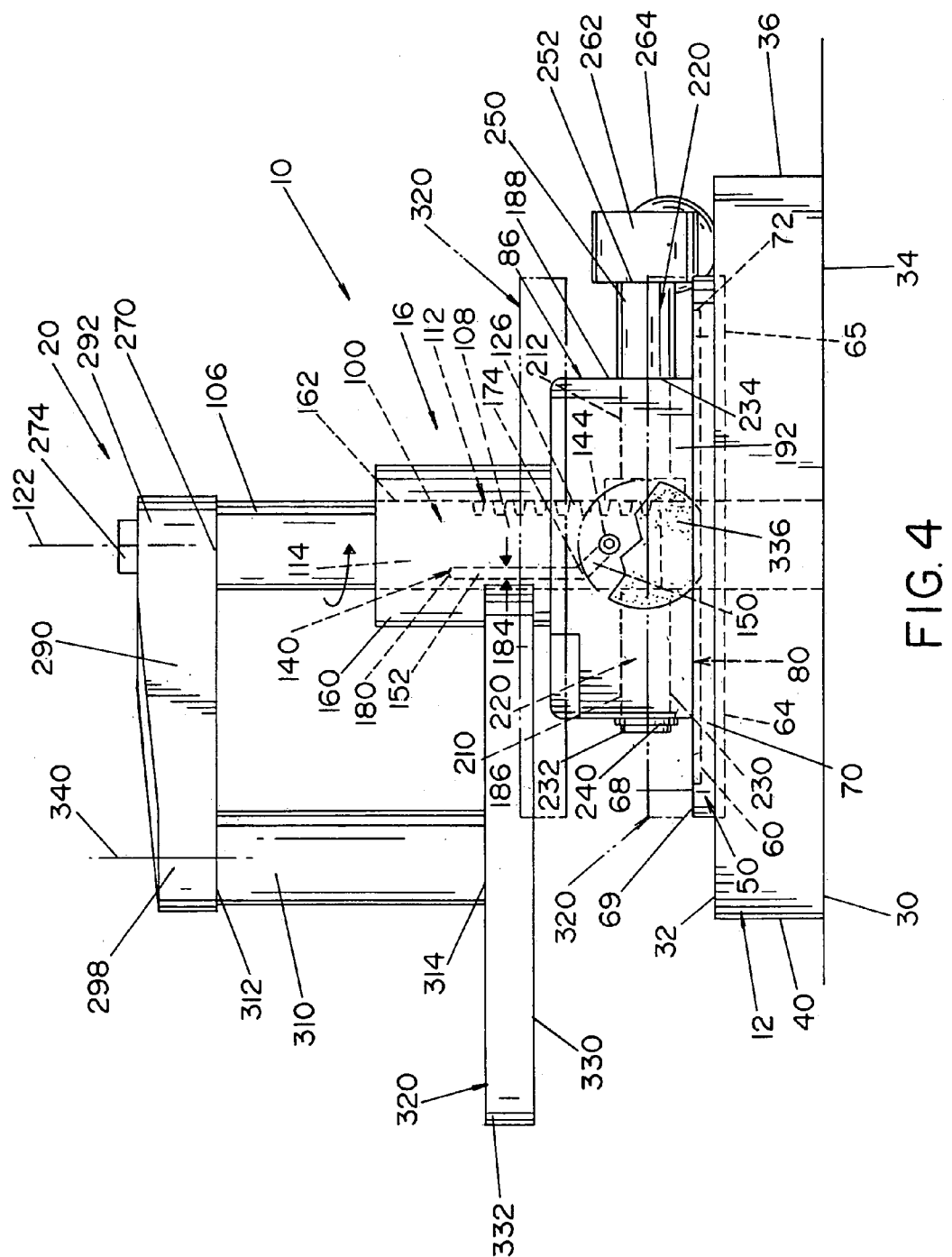
FIG. 4 is a partially sectioned front elevational view of the tortilla forming machine shown in FIG. 1.
Figure 5:
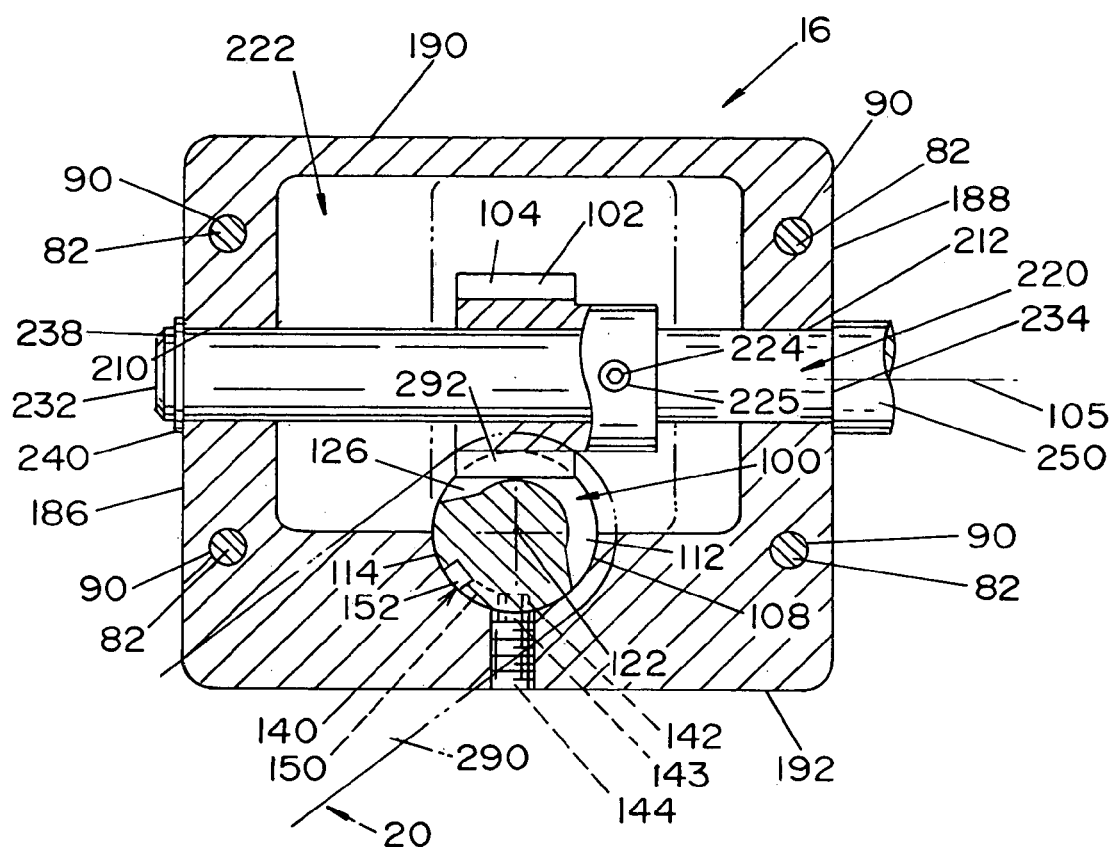
FIG. 5 is a sectional view of an actuating mechanism for the tortilla forming machine shown in FIG. 1.
Figure 6:
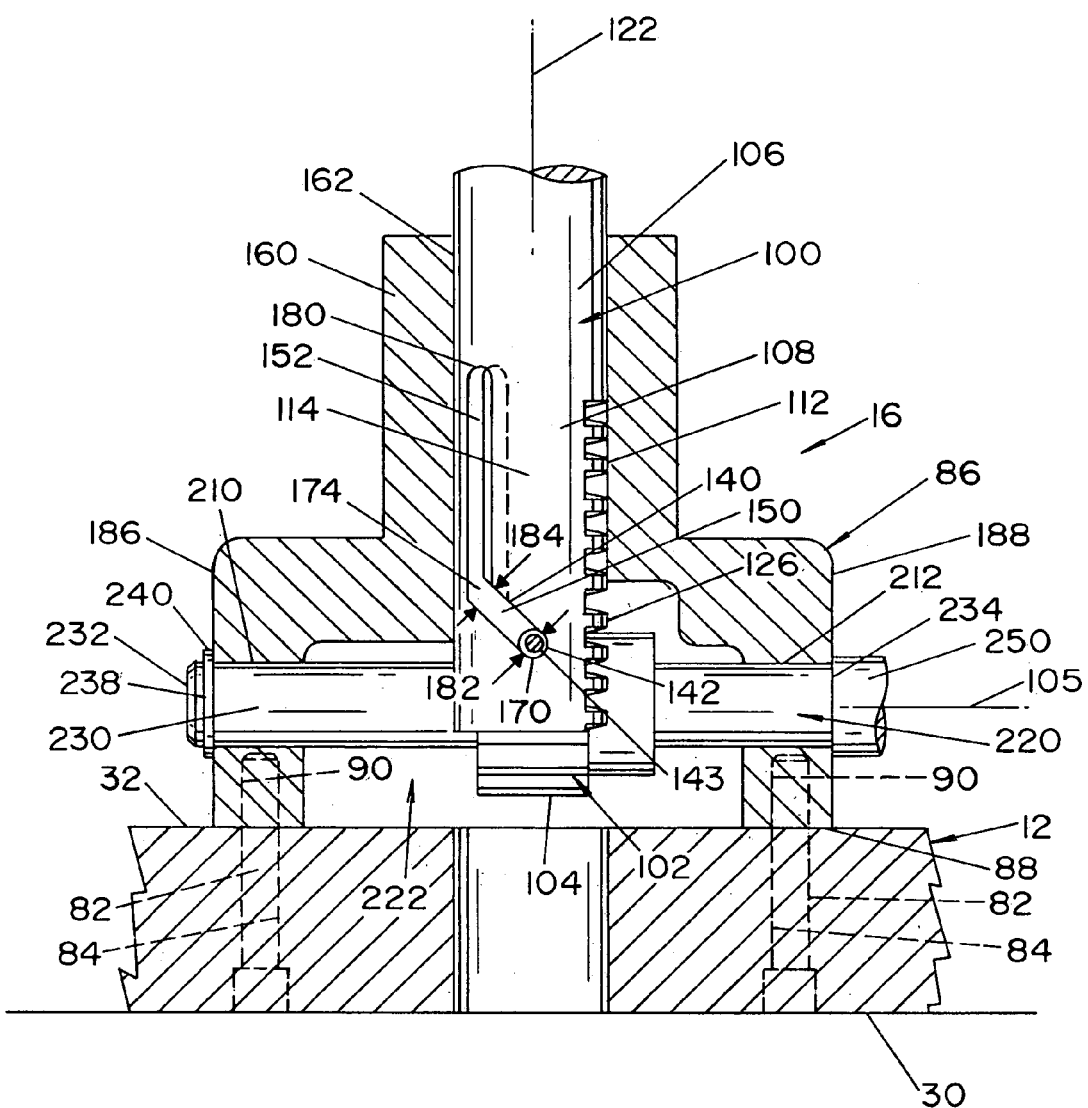
FIG. 6 is a partially sectional view taken along line 6—6 of FIG. 2 of the actuating mechanism for the tortilla forming machine shown in FIG. 1; and, FIG. 7 is a partially sectional view taken along line 7—7 of FIG. 2 of the actuating mechanism for the tortilla forming machine shown in FIG. 1.
Figure 7:
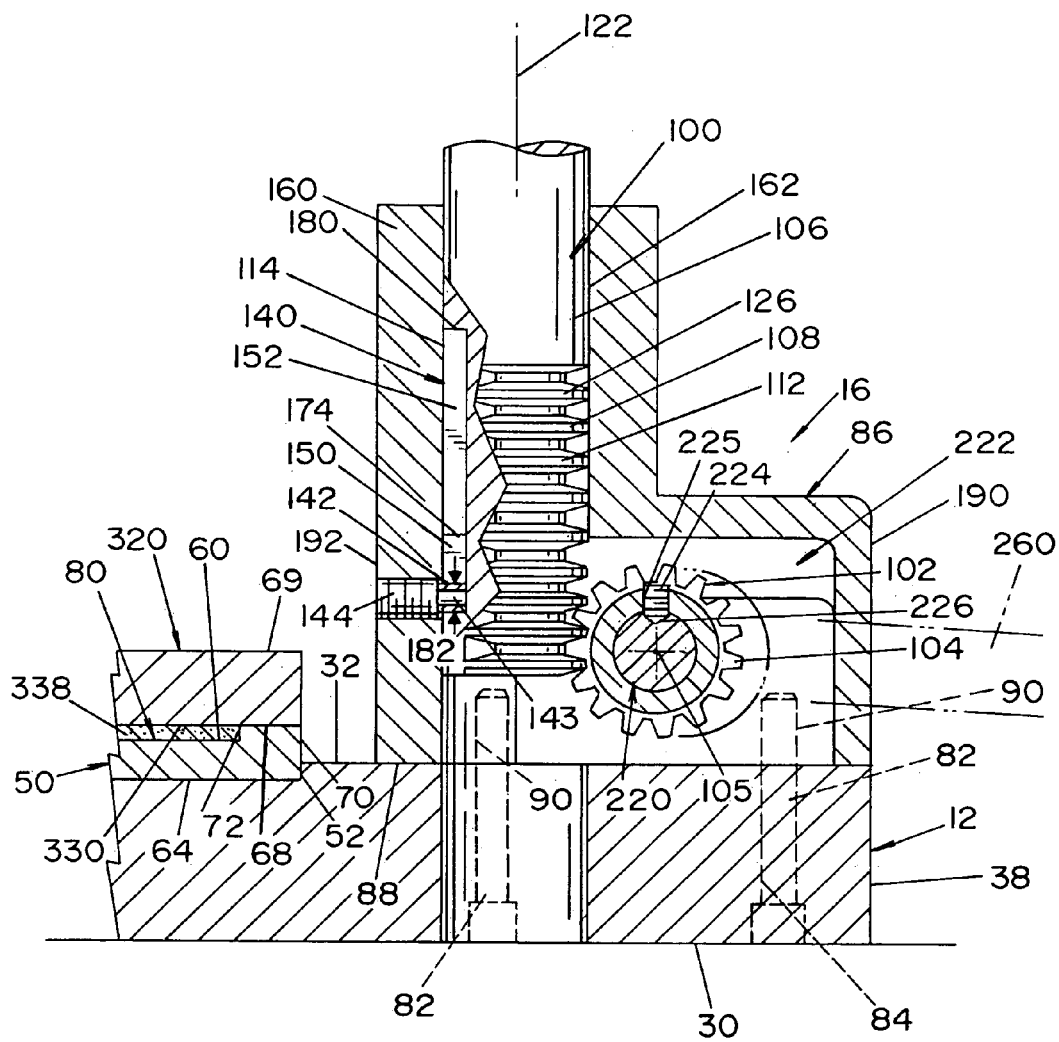

Referring now in greater detail to the drawings wherein the showings are for the purpose of illustrating a preferred embodiment of the invention only, and not for the purpose of limiting the invention, FIGS. 1–7 illustrate a tortilla forming machine 10 having a base 12, an actuating mechanism 16, and an upper push mechanism 20. Base 12 is shown to be rectangular, however, base 12 can be virtually any configuration which is functional for the environment in which the machine is used. Base 12 includes a bottom surface 30 for resting on an underlying support structure which is not discussed in detail herein since it can be any type of support structure. Base 12 further includes a top surface 32 and edges 34, 36, 38, and 40. Base 12 supports a first or upwardly facing forming member 50 which can utilize known forming configurations without detracting from the invention of this application. In this respect, forming member 50 can utilize a forming cavity having a depth and an outer perimeter corresponding with the desired thickness and shape of the tortilla shell or can utilize a large forming surface and forming rings to create a system which can be easily converted to multiple tortilla sizes and shapes. Base 12 can further include a pilot hole 52 that can properly align a first or upper forming surface 60 relative to a forming axis 62. As is shown, first or upper forming member 50 is a forming plate style having a bottom surface 64 which rests on top surface 32 of base 12 and a bottom pin 66 extending downwardly from bottom surface 64 for engagement with pilot hole 52 to properly align forming member 50 relative to forming axis 62. Forming member 50 further includes a peripheral lip 68 having a top edge 69, an outer edge 70 and an inner cavity edge 72. The height of inner cavity edge 72 controls the thickness of the tortilla shell formed by machine 10. The top can be used as a stop which will be discussed in greater detail below. As is shown, edge 72 is circular and extends about first forming surface 60 which will produce a circular tortilla shell when the dough is formed. Forming surface 60 and edge 72 form a lower portion of a mold cavity 80. Again, the mold cavity can be any size and/or configuration without detracting from the invention of this application. The mold cavity can be made from any material which can be used in connection with food processing including use of food grade stainless steels. First forming member is positioned on base 12 near side 34.

Positioned near side 38 of base 12 is actuating mechanism 16. Actuating mechanism 16 is securely fastened to base 12 by four fasteners 82. More particularly, base 12 includes four through holes 84 shaped and sized to receive fasteners 82. Actuating mechanism 16 has a housing 86 which supports the internal mechanisms and which is mountable to base 12. Housing 86 includes a bottom surface 88 which rests on top surface 32 of base 12. In addition, housing 86 includes four threaded holes extending inwardly from bottom surface 88 which are configured to align with through holes 84 of base 12. Fasteners 82 have a length sufficient to extend through holes 84 and threadingly engage with threaded holes 90 thereby securing actuating mechanism 16 relative to base 12. It should be noted that actuating mechanism 16 can be connected or fastened to base 12 by any known means of securing two objects relative to one another.

Actuating mechanism includes a rack 100 and a pinion gear 102 mounted in housing 86. Pinion gear 102 has pinion teeth 104 circumferentially spaced about a pinion axis 105. Turning to rack 100, it includes an upper bearing and support portion 106 and a drive portion 108. Drive portion 108 has a circular cross-sectional configuration with a rearwardly facing gear section 112 extending circumferentially about a portion of drive portion 108 and a forward surface 114. Gear section includes gear teeth 126 shaped and configured to matingly engage with gear teeth 104 of pinion 102. Rack 100 is a vertically extending rack and rotation of pinion 102 drives rack 100 axially upwardly and downwardly relative to an actuating axis 122 of the actuating mechanism. The rotation of pinion 102 will be discussed in greater detail below. Drive portion 108 includes sufficient gear teeth 126 to actuate upper push member 20 between an access position 128 and a forming position 130 which will also be discussed in greater detail below. Teeth 126 extend circumferentially about gear section 112 approximately 270° which is sufficient to allow rotational movement about actuating axis 122 while maintaining gear engagement with pinion gear teeth 104.

The rotation about actuating axis 122 is generated by a cam 140 and a cam follower 142. Cam 140 can be a groove cut into the forward surface 114 of gear section 112. Cam follower 142 can be rigidly connected to housing 86 of actuating mechanism 16 to maintain the cam follower relative to the actuating housing and the base. Cam 140 includes a lower section 150 and a vertical section 152. In general terms, lower section 150 of cam 140 is intended to produce rotation about actuating axis 122 as rack 100 moves upwardly and downwardly. Vertical section 152 is intended to produce only axial movement of rack along axis 122. Both of these movements will be discussed in greater detail below. Housing 86 further includes an upward bearing extension 160 having rack bearing hole 162. Bearing hole 162 is sized to slidingly receive support portion 106 to help guide rack 100. Accordingly, bearing hole 162 has a circular cross-sectional configuration slightly larger than the circular cross-sectional configuration of at least support portion of rack 100. This portion of the rack has a smooth circular cross-sectional configuration creating bearing-like engagement between bearing hole 162 and rack 100. Upward bearing extension 160 can extend upwardly from housing 86 to help rigidly maintain the rack within the housing and only allow axial and rotational motion relative to actuating axis 122. Furthermore, upward bearing extension 160 allows at least a portion of rack bearing hole 162 to always engage upper bearing and support portion 106 of rack 100. Bearing hole can also include a seal (not shown) to help seal the inner workings of machine 10 from the food preparation process.

Turning to cam 140 and cam follower 142, lower section 150 of cam 140 extends upwardly from cam bottom 170 to cam transition 174. Between bottom 170 and transition 174, cam 140 extends both circumferentially and axially about forward surface 114 of gear section 112. Vertical section 152 of cam 140 extends between transition 174 and a top cam end 180. Vertical section 150 extends essentially axially only. It should be noted that the configuration of cam 140 can be modified based on the desired rotational and vertical movement of forming machine 10 without detracting from the invention of this application. Cam follower 142 can be a circular pin having a diameter 182 which is sufficiently smaller than width 184 of cam 140. Cam 140 essentially has a uniform width 184 from bottom cam end 170 to top cam end 180. In operation, as rack 100 moves downwardly within rack bearing hole 162, the engagement between cam follower 142 and cam 140 causes both rotational and axial movement of rack 100 relative to actuating axis 122 as cam follower 142 moves through the lower section 150. As can be appreciated, the range of rotation about axis 122 can vary. In this respect, in one embodiment, the rotation about axis 122 is greater than 20°. In another embodiment the rotation about axis 122 is less than 90°. In a further embodiment, the rotation about axis 122 between 20° and 90°. In yet another embodiment, the rotation about axis 122 is between 30° and 60° wherein the range can be approximately 45°. Then, at transition point 174, the movement is changed such that with continued downward movement, cam 140 allows only axial movement of rack 100 relative to actuating axis 122. Similar to above, the range of the axial actuation can vary. In this respect, in one embodiment, the axial actuation along axis 122 is less than 7 inches. In another embodiment, the axial actuation alone axis 122 is less than 3 inches. In yet another embodiment, the axial actuation along axis 122 is less than 3 inches and the rotation about axis 122 is between 35° and 55°. Utilizing gear teeth 126 which extends circumferentially about gear section 112 allow the gear engagement between teeth 126 and pinion teeth 104 to be maintained even during the rotational movement of rack 100. Bottom cam end and top cam end can define the upper and lower limits of the movement of the rack which will be discussed in greater detail below. When cam follower 142 is at or near bottom cam end 170, tortilla-forming machine 10 is in access position 128. As cam follower 142 moves away from end 170 and toward top cam end 180, taco-forming machine 10 is activated toward forming position 130. It should be noted, that in view of the different thicknesses of the tortilla shell and the different styles of first forming members, vertical section 152 can extend upwardly sufficiently beyond the desired range of motion when the tortilla shell is being formed. In this respect, the cam and cam follower do not need to be used as the stops for the actuating mechanism either for the access or the forming position. As will be discussed in greater detail below, the forming surfaces and related forming structure can also be used as the stop for the actuating mechanism. Furthermore, separate stops (not shown) can also be used to limit actuating travel.

Housing 86 of actuating mechanism 16 further includes sides 186 and 188, back 190, and front 192. Cam follower 142 is shown positioned in housing front 192. Side 186 includes through hole 210 and side 188 includes through hole 212 which are axially aligned with one another and coaxial to pinion axis 105 for receiving a pinion shaft 220. Pinion 102 is securely fastened to pinion shaft 220 within pinion cavity 222. While any known means in the art can be used, pinion 102 can be secured to pinion shaft 220 by threaded fastener 224. Threaded fastener 224 threadingly engages threaded hole 225 of pinion 102 and at least partially penetrates a shaft hole or axial groove 226 to ensure that pinion 102 does not rotate relative to pinion shaft 220. Pinion shaft 220 includes a housing end portion 230 extending from shaft end 232 to a shoulder 234. Housing end portion is circular and is shaped and sized to be received in through holes 210 and 212 of housing 86 for rotation about pinion axis 105. Housing end portion further includes a retaining groove 238 which is shaped to receive a retainer clip 240 whereby pinion shaft 220 is maintained in housing 86 by the engagement between shoulder 234 and retainer clip 240.

Pinion shaft 220 further includes a handle end portion 250 which extends between shoulder 234 and an end 252. Handle end has a length which is sufficient to properly position a handle 260 which is attached near end 252. More particularly, tortilla-forming machine 10 is desired to form a wide range of tortilla shells. In order to create an ergonomical work station, the portions of the tortilla-forming machine which are operated by the user are all positioned for operation by a user standing near front edge 34. As a result, handle 260 routes about axis 105 such that handle end 266 moves toward front edge 34 and first forming member 50 is also near front edge 34. Therefore, handle 260 should be sufficiently spaced from first forming member 50 to prevent interference between these two mechanisms. Handle 260 includes a handle base 262 adapted to interengage with pinion shaft 220. Any known means in the art can be used to secure the base to the shaft. Handle 260 can further include a grasp ball 264 at handle end 266. Grasp ball 264 can be used to create a better grip between the user's hand and the handle. It should be noted that any handle configuration could be utilized to rotate pinion shaft 220 and further, any known grip could be used on handle end 266. While it is preferred that handle 260 be spaced on the opposite side of actuating axis 122 than upper push mechanism 20 when it is in the access position 128, the handle can be positioned on either side of machine 10 without detracting from the invention of this application. Furthermore, in order to accommodate both left-handed and right-handed users, the handle can be positioned on both sides of the actuating axis. Another modification is that the actuating mechanism could be reversed so that the upper push plate moves to the right of the base when in the access position. In addition, the gear ratio between the rack and the pinion can be modified to produce a desired mechanical advantage for forming the dough ball into a tortilla shell. Different gear ratios can be used based on the desired application for the machine. Dough which is more difficult to form may necessitate additional mechanical advantage than soft doughs. It has been found that a handle rotation between 75° and 115° is comfortable for the user. Accordingly, in one embodiment, handle 260 rotates about axis 105 more than 75°. In another embodiment, the handle rotates about handle axis between 75° and 115°. Tortilla-forming machine 10 can further include a return spring (not shown) which automatically moves tortilla forming machine 10 between forming position 130 and an access portion 128.

Upper push mechanism 20 is connected to a top end 270 of rack 100. In this respect, top end 270 of rack 100 includes a threaded hole 272 for receiving a bolt 274, and a pin hole 278 for receiving an anti-rotation pin 280. A push arm 290 of member 20 has an actuating end 292 and is connected to top end 270 by a bolt 274 that passes through push arm 290 and threadingly engages threaded hole 272. Actuating end 292 also includes a pin hole 296 for receiving anti-rotation pin 280. Anti-rotation pin 280 prevents relative rotation between push arm 290 and rack 100. Once bolt 274 is sufficiently tightened, push arm 290 is rigidly secured to rack 100 and moves therewith. Push arm 290 is an elongated member having generally a rectangular cross-sectional configuration, however, push arm 290 can be tapered between actuating end 292 and a forming end 298. The taper between actuating end 292 and forming end 298 can involve either/or the top surface and bottom surface of arm 290 and/or side surfaces of arm 290. Furthermore, actuating end 292 and forming end 298 can be rounded.

Upper push mechanism 20 further includes an extension 310 to account for the height of actuating mechanism 16 and to provide sufficient work space for loading and unloading dough. Extension 310 has a top end 312 and a bottom end 314. Top end 312 of extension 310 is secured to push arm 290 near forming end 298. Extension 310 can be secured to push arm 290 by any means including welding, threaded fasteners, locking pins, etc. When used in connection with a round forming cavity, it is not essential that extension 310 be prevented from rotating relative to arm 290. However, if non-circular configurations are desired, extension 310 can be fastened to arm 290 to prevent relative rotation therebetween. A push plate 320 is secured to bottom end 314 of extension 310. Depending on the style of mold cavities which is to be used in connection with tortilla-forming machine 10, it may be advantageous to make push plate 320 selectively attachable to extension 310. In this respect, if a ring style cavity is utilized, a large push plate can be utilized for all different sizes and shapes of tortilla shells. However, if push plate 320 is not flat such as it includes a cavity portion that produces more than just the top surface of the mold cavity and/or if push plate 20 includes an embossing feature, selective interengagement with extension 310 would be advantageous.

Push plate 320 includes second or downwardly facing forming surface 330 for engaging dough ball 336 and forming the dough ball into a tortilla shell 338. Accordingly, as stated above, if forming surface 320 is merely a flat surface, it can be utilized for a wider range of tortilla sizes and shapes. Push plate 330 is shown to be circular with a circular outer edge 332 having a diameter which is greater than the desired diameter of formed tortilla shell 338. As with the interengagement between extension 310 and arm 290, if forming surface 330 is a flat surface which only forms the top surface of the mold cavity and tortilla forming machine 10 is used in connection with round tortilla shells, it is not critical that push plate 320 be prevented from rotating relative to extension 310 or push arm 290. However, some cavity styles and some peripheral shapes may necessitate push plate 330 being prevented from rotating relative to extension 310 and arm 290. Forming surface 330 is essentially coaxial to an upper forming axis 340.

In operation, the rotation of handle 260 moves tortilla-forming machine 10 between access position 128 and forming position 130. If machine 10 includes a return spring, it will automatically return to access position 128 when the user releases handle 260. It should be noted that, in order to prevent the slamming of the machines mechanisms by the spring return, cushioning mechanisms can be used. Cushions can include air cushions, low durometer materials or any other cushions know in the art. Starting in the access position, cam follower 142 is at or near bottom cam end 170, rack 100 is in its full vertical extension and in its full clockwise rotation about actuating axis 122. As a result, push plate 320 and forming surface 330 are also at their uppermost limits and at their clockwise rotational limits about axis 122. This position is intended to allow the user of the machine to unload and load the dough products. This process of loading and unloading essentially takes place in a forming space of the machine which is an imaginary three dimensional space extending upwardly from the outer peripheral edge of the mold cavity. As can be appreciated, the forming space represents a space that should be freely accessible to the user allow the user to properly position the dough ball and to easily remove the formed tortilla shell. Based on the clockwise rotation of forming surface, the forming space is freely accessible even though the upward movement of push plate 320 is minimal and while the forming surfaces remain parallel to one another. As can also be appreciated, forming dough ball 336 with parallel forming surfaces allows the dough to more evenly and more predicably flow within the mold cavity.

As the user rotates handle 260 counterclockwise about pinion axis 105, pinion teeth 104 engage rack teeth 126 to drive rack 100 downwardly into housing 86. Since cam follower 142 is locked in position in housing 86, the follower begins to travels upwardly through lower cam section 150 toward transition point 174. As this occurs, rack 100 moves axially downwardly in bearing hole 162 and also rotates counterclockwise relative to actuating axis 122. As a result, forming surface 330 of push plate 320 also moves downwardly toward base 12 and also rotates counterclockwise relative to actuating axis 122. During this movement, upper forming axis 340 is moving toward lower forming axis 62. Once rack 100 moves downward sufficiently to position cam follower 142 in transition 174, upper forming axis 340 becomes aligned with forming access 62. Once cam follower 142 enters vertical section 152, the rotational movement stops and forming surface 330 of push plate 320 moves linearly downwardly to engage the dough ball. During this entire motion, second or downwardly facing forming surface 330 is maintained parallel to first or upwardly facing forming surface 60. Accordingly, as forming surface 330 engages the dough ball, it evenly spreads the dough between the parallel surfaces to produce a more uniform thickness tortilla shell. As the user continues to rotate handle 260 about pinion axis 105, the forming surfaces continue to form the dough ball into the tortilla shell until forming surface 330 engages peripheral lip top 69 wherein the tortilla shell has been completely formed. As is stated above, different types of forming cavity can be utilized in connection with the invention of this application. Further more, different types of stops can be used to stop either the upward or downward travel of the rack. With the tortilla forming cavity show, the machine 10 utilizes the engagement between forming surface 330 and peripheral lip top 69.

Once the tortilla-forming machine is in the forming position, the tortilla shell is completely formed and the user can either rotate the handle back to the access position or merely release the handle if a spring return is utilized. As this takes place, the upward movement of rack 100 causes cam follower 142 to move downwardly in vertical section 152 thereby only producing axial movement of forming surface 330 to allow clean disengagement of the forming surface from the tortilla shell. This continues until cam follower reaches transition point 174. Then, the continued upward movement of rack causes cam follower 142 to enter lower section 150. While in lower section 150, the engagement between cam 140 and cam follower 142 rotates forming surface 330 and push plate 320 clockwise about actuating axis 122 and away from the forming space to allow easy access to the formed tortilla shell. The parallel forming surface action and the rotation can be important since a formed and uncooked tortilla shell is fragile and may need to be grasped by multiple points about the periphery of the tortilla shell. Having a forming surface that is clear from obstruction by any component of forming machine 10 allows the user to grasp the tortilla shell as is needed to remove it from the mold cavity. The clockwise rotational and upward movement of forming surface 330 and push plate 320 continue until cam follower 142 engages cam bottom end 170 or another stop is engaged. As is stated above, while not shown, the cam and cam follower do not need to be utilized as the stops for the movement of rack 100.

Again, it should be noted that while upper push mechanism 20 is shown to rotate clockwise about actuating axis 122 as it approaches the access position, the rotation could be counterclockwise about actuating axis 122 without detracting from the invention of this application. Furthermore, the handle can be position on either or both sides of the base.

While considerable emphasis has been placed on the preferred embodiment of the invention illustrated and described herein, it will be appreciated that other embodiments can be made and that many changes can be made in the preferred embodiment without departing from the principles of the invention. Accordingly, it is to be distinctly understood that the foregoing descriptive matter is to be interpreted merely as illustrative of the invention and not as a limitation.

Having thus described the invention, it is claimed:

1. A tortilla forming machine for molding dough into a tortilla shell, said forming machine comprising: a base having an first forming surface, a push plate having a second forming surface and an actuating mechanism for actuating said second forming surface between a loading position and a forming position to mold the dough into the tortilla shell, said actuating mechanism actuating said second forming surface relative to an actuating axis which is laterally spaced from and perpendicular to said first forming surface, said actuating mechanism actuating said second forming surface axially parallel to said actuating axis and rotating said second forming surface about said actuating axis.

2. The forming machine according to claim 1, wherein said actuation about said actuating axis is simultaneous to at least a portion of said axial actuation.

3. The forming machine according to claim 1, wherein said actuation about said actuating axis is greater than 20 degrees.

4. The forming machine according to claim 3, wherein said actuation about said actuating axis is less than 90 degrees.

5. The forming machine according to claim 1, wherein said actuation about said actuating axis is less than 90 degrees.

6. The forming machine according to claim 1, wherein said actuation about said actuating axis is between 30 degrees and 60 degrees.

7. The forming machine according to claim 6, wherein said actuation about said actuating axis is approximately 45 degrees.

8. The forming machine according to claim 1, wherein said axial actuation is less than 7 inches.

9. The forming machine according to claim 1, wherein said axial actuation is less than 3 inches.

10. The forming machine according to claim 1, wherein said axial actuation is less than 3 inches and said actuation about said actuating axis is between 35 and 55 degrees.

11. The forming machine according to claim 1, wherein said actuating mechanism includes a rack and pinion.

12. The forming machine according to claim 11, wherein said actuating mechanism further includes a cam and a cam follower.

13. The forming machine according to claim 12, wherein said forming machine further includes a handle which is jointed to said pinion, said rack including said cam and said base including said cam follower.

14. The forming machine according to claim 13, wherein said handle rotates about said handle axis more than 75 degrees.

15. The forming machine according to claim 14, wherein said handle rotates about said handle axis less than 115 degrees.

16. The forming machine according to claim 1, wherein said first and second forming surfaces remain parallel to one another during said actuation.

17. A tortilla forming machine for molding dough into a tortilla shell, said forming machine comprising: a base having an upwardly facing forming surface that is stationary relative to said base, an actuating mechanism for moving a push plate relative to said base between a loading position and a forming position, said push plate having a downwardly facing forming surface that in connection with said upwardly facing forming surface forms the dough into the tortilla shell as it approaches said forming position, said forming surfaces remaining parallel to one another as said push plate moves between said loading and said forming positions, and said forming surfaces being aligned over one another in said forming position and being misaligned in said loading position.

18. A tortilla forming machine for molding dough into a formed tortilla shell, said forming machine comprising a base and a push plate, said base having an first forming surface which includes a first surface portion that is perpendicular to a forming axis and is surrounded by a first peripheral edge corresponding to a peripheral shell edge of the formed shell, said peripheral edge defining a cylindrical forming space extending perpendicularly from said first surface portion, said push plate having a second forming surface with a second surface portion which is surrounded by a second peripheral edge also corresponding to the peripheral shell edge, said forming machine further including an actuating mechanism to move said second surface portion relative to said first surface portion between a loading position and a forming position such that said second surface portion remains parallel to said first portion in both said loading and forming positions, when in said forming position said second surface portion being substantially within said forming space and when in said loading position being at least partially outside of said forming space.

* * * * *